US006357096B1

(12) United States Patent
James et al.

(10) Patent No.: US 6,357,096 B1
(45) Date of Patent: Mar. 19, 2002

(54) SUSPENSION DOWEL AND BUSHING REMOVER DEVICE

(76) Inventors: Cleve C. James, 8396 Turtle La.; Roger James, 8396 Turle La., both of Tobyhanna, PA (US) 18466

(*) Notice: Subject to any disclaimer, the term of this patent is extended or adjusted under 35 U.S.C. 154(b) by 0 days.

(21) Appl. No.: 09/552,835

(22) Filed: Apr. 20, 2000

(51) Int. Cl.[7] .................................................. B23P 19/04
(52) U.S. Cl. .......................................................... 29/263
(58) Field of Search ........................... 29/256, 258–265, 29/280, 282, 263; 269/49, 48.2

(56) References Cited

U.S. PATENT DOCUMENTS

| | | | | |
|---|---|---|---|---|
| 2,916,813 A | | 12/1959 | Belanger | |
| 3,740,814 A | | 6/1973 | Marshell | |
| 4,263,705 A | | 4/1981 | Devening | |
| 5,075,948 A | | 12/1991 | Maier | |
| D370,608 S | | 6/1996 | Wagner | |
| 5,848,460 A | * | 12/1998 | Rasmussen et al. | 29/263 |

* cited by examiner

*Primary Examiner*—Robert C. Watson

(57) ABSTRACT

A suspension dowel and bushing remover device for easily and quickly removing dowels and bushing from suspensions on trucks and buses. The suspension dowel and bushing remover device includes a retainer housing having a first end and an open second end with the first end having a hole therethrough and with the second end of said retainer housing being adapted to urge against a suspension for removing a dowel and bushing therefrom and into the retainer housing through the open second end; and also includes a shaft having a first end portion, a second end portion and a second end with the shaft extending through the retainer housing through the hole in the first end; and further includes a cam member being securely attached to the second end of the shaft and having a cam lobe for engaging an end portion of a dowel and a bushing; and also includes a collar having a bore extending therethrough and being removably disposed about the second end portion of the shaft and being movable in and out of the second end of the retainer housing for spacing the shaft within the retainer housing; and further includes a fastening member threaded upon the shaft and a stopper disposed about the shaft for securing and moving the shaft relative to the retainer housing to remove the dowel or bushing from the suspension.

19 Claims, 3 Drawing Sheets

FIG.3
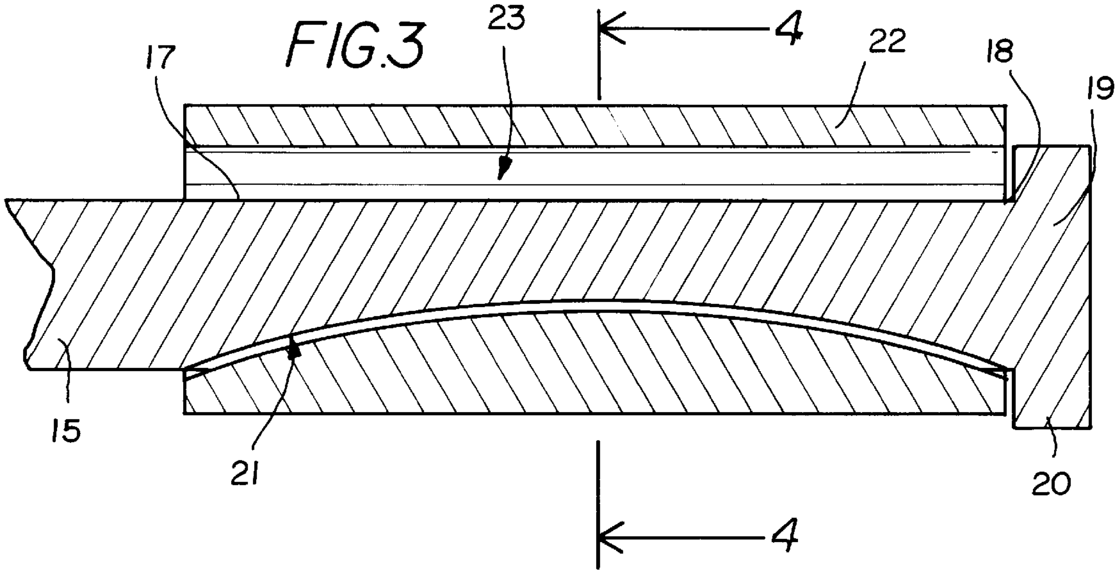
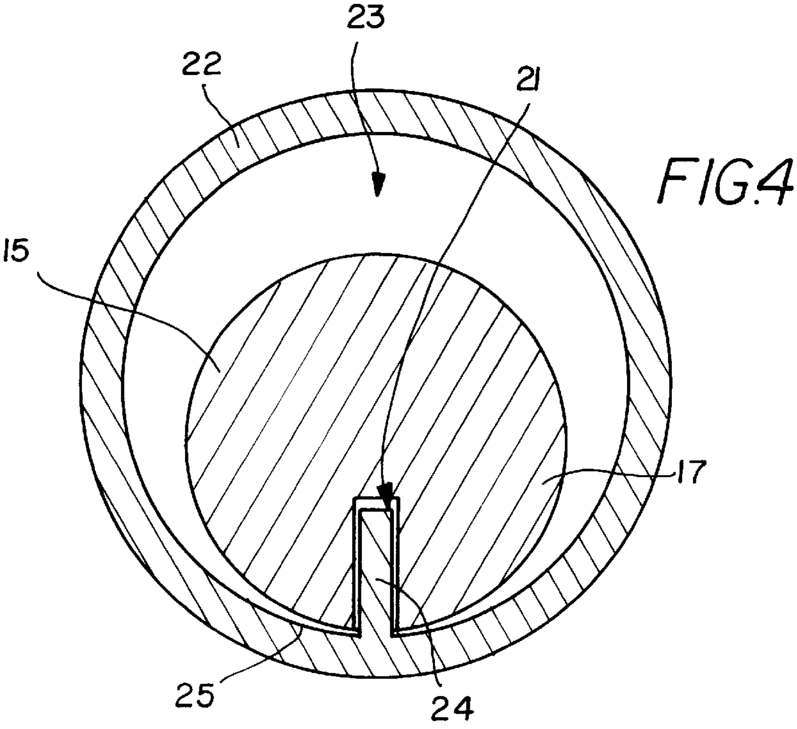
FIG.4

SUSPENSION DOWEL AND BUSHING REMOVER DEVICE

BACKGROUND OF THF INVENTION

1. Field of the Invention

The present invention relates to an undercarriage dowel and bushing remover and more particularly pertains to a new suspension dowel and bushing remover device for easily and quickly removing dowels and bushing from suspensions on trucks and buses.

2. Description of the Prior Art

The use of an undercarriage dowel and bushing remover is known in the prior art. More specifically, an undercarriage dowel and bushing remover heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,075,948; U.S. Pat. No. 4,263,705; U.S. Pat. No. 3,740,814; U.S. Pat. No. 2,916,813; U.S. Pat. No. 2,220,376; and U.S. Pat. No. Des. 370,608.

While these devices fulfill their respective, particular objectives and requirements, the aforementioned patents do not disclose a new suspension dowel and bushing remover device. The inventive device includes a retainer housing having a first end and an open second end with the first end having a hole therethrough and with the second end of said retainer housing being adapted to urge against a suspension for removing a dowel and bushing therefrom and into the retainer housing through the open second end; and also includes a shaft having a first end portion, a second end portion and a second end with the shaft extending through the retainer housing through the hole in the first end; and further includes a cam member being securely attached to the second end of the shaft and having a cam lobe for engaging an end portion of a dowel and a bushing; and also includes a collar having a bore extending therethrough and being removably disposed about the second end portion of the shaft and being movable in and out of the second end of the retainer housing for spacing the shaft within the retainer housing; and further includes a fastening member threaded upon the shaft and a stopper disposed about the shaft for securing and moving the shaft relative to the retainer housing to remove the dowel or bushing from the suspension.

In these respects, the suspension dowel and bushing remover device according to the present invention substantially departs from the conventional concepts and designs of the prior art, and in so doing provides an apparatus primarily developed for the purpose of easily and quickly removing dowels and bushing from suspensions on trucks and buses.

SUMMARY OF THE INVENTION

In view of the foregoing disadvantages inherent in the known types of undercarriage dowel and bushing remover now present in the prior art, the present invention provides a new suspension dowel and bushing remover device construction wherein the same can be utilized for easily and quickly removing dowels and bushing from suspensions on trucks and buses.

The general purpose of the present invention, which will be described subsequently in greater detail, is to provide a new suspension dowel and bushing remover device which has many of the advantages of the undercarriage dowel and bushing remover mentioned heretofore and many novel features that result in a new suspension dowel and bushing remover device which is not anticipated rendered obvious, suggested, or even implied by any of the prior art undercarriage dowel and bushing remover, either alone or in any combination thereof.

To attain this, the present invention generally comprises a retainer housing having a first end and an open second end with the first end having a hole therethrough and with the second end of said retainer housing being adapted to urge against a suspension for removing a dowel and bushing therefrom and into the retainer housing through the open second end; and also includes a shaft having a first end portion, a second end portion and a second end with the shaft extending through the retainer housing through the hole in the first end; and further includes a cam member being securely attached to the second end of the shaft and having a cam lobe for engaging an end portion of a dowel and a bushing; and also includes a collar having a bore extending therethrough and being removably disposed about the second end portion of the shaft and being movable in and out of the second end of the retainer housing for spacing the shaft within the retainer housing; and further includes a fastening member threaded upon the shaft and a stopper disposed about the shaft for securing and moving the shaft relative to the retainer housing to remove the dowel or bushing from the suspension.

there has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. Lathe invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public Generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new suspension dowel and bushing remover device which has many of the advantages of the undercarriage dowel and bushing remover mentioned heretofore and many novel features that result in a new suspension dowel and bushing remover device which is not anticipated, rendered obvious, suggested, or even implied by any of the prior art undercarriage dowel and bushing remover, either alone or in any combination thereof.

It is another object of the present invention to provide a new suspension dowel and bushing remover device which may be easily and efficiently manufactured and marketed.

It is a further object of the present invention to provide a new suspension dowel and bushing remover device which is of a durable and reliable construction.

An even further object of the present invention is to provide a new suspension dowel and bushing remover device which is susceptible of a low cost of manufacture with regard to both materials and labor, and which accordingly is then susceptible of low prices of sale to the consuming public, thereby making such suspension dowel and bushing remover device economically available to the buying public.

Still yet another object of the present invention is to provide a new suspension dowel and bushing remover device which provides in the apparatuses and methods of the prior art some of the advantages thereof, while simultaneously overcoming some of the disadvantages normally associated therewith.

Still another object of the present invention is to provide a new suspension dowel and bushing remover device for easily and quickly removing dowels and bushing from suspensions on trucks and buses.

Yet another object of the present invention is to provide a new suspension dowel and bushing remover device which includes a retainer housing having a first end and an open second end with the first end having a hole therethrough and with the second end of said retainer housing being adapted to urge against a suspension for removing a dowel and bushing therefrom and into the retainer housing through the open second end; and also includes a shaft having a first end portion, a second end portion and a second end with the shaft extending through the retainer housing through the hole in the first end; and further includes a cam member being securely attached to the second end of the shaft and having a cam lobe for engaging an end portion of a dowel and a bushing; and also includes a collar having a bore extending therethrough and being removably disposed about the second end portion of the shaft and being movable in and out of the second end of the retainer housing for spacing the shaft within the retainer housing; and further includes a fastening member threaded upon the shaft and a stopper disposed about the shaft for securing and moving the shaft relative to the retainer housing to remove the dowel or bushing from the suspension.

Still yet another object of the present invention is to provide a new suspension dowel and bushing remover device that eliminates a user from having to pound and pry the dowel or bushing from the suspension.

Even still another object of the present invention is to provide a new suspension dowel and bushing remover device that is convenient and simple to understand and use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a longitudinal cross-sectional view of the shaft, cam member and collar of the present invention.

FIG. 4 is a lateral cross-sectional view of shaft and collar of the present invention.

DESCRIPTION OF THE PREFERRED EMBODIMENT

Figure 1:
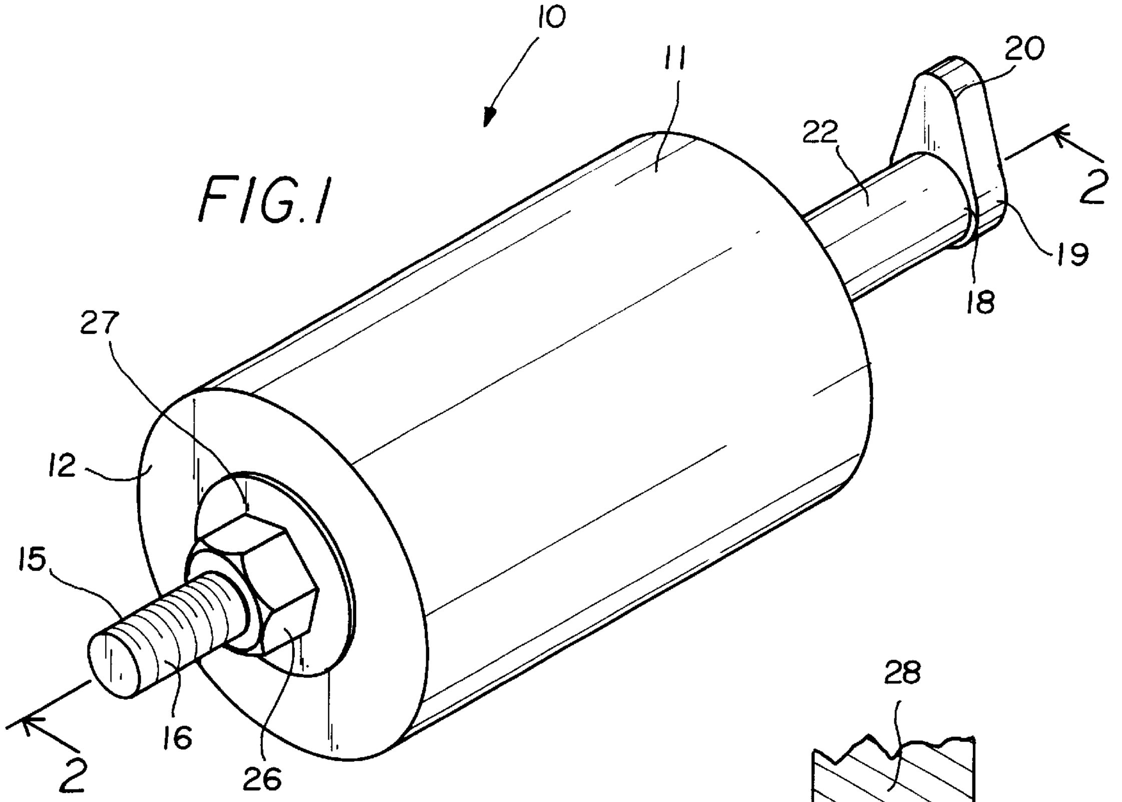
FIG. 1 is a perspective view of a new suspension dowel and bushing remover device according to the present invention.
Figure 2:
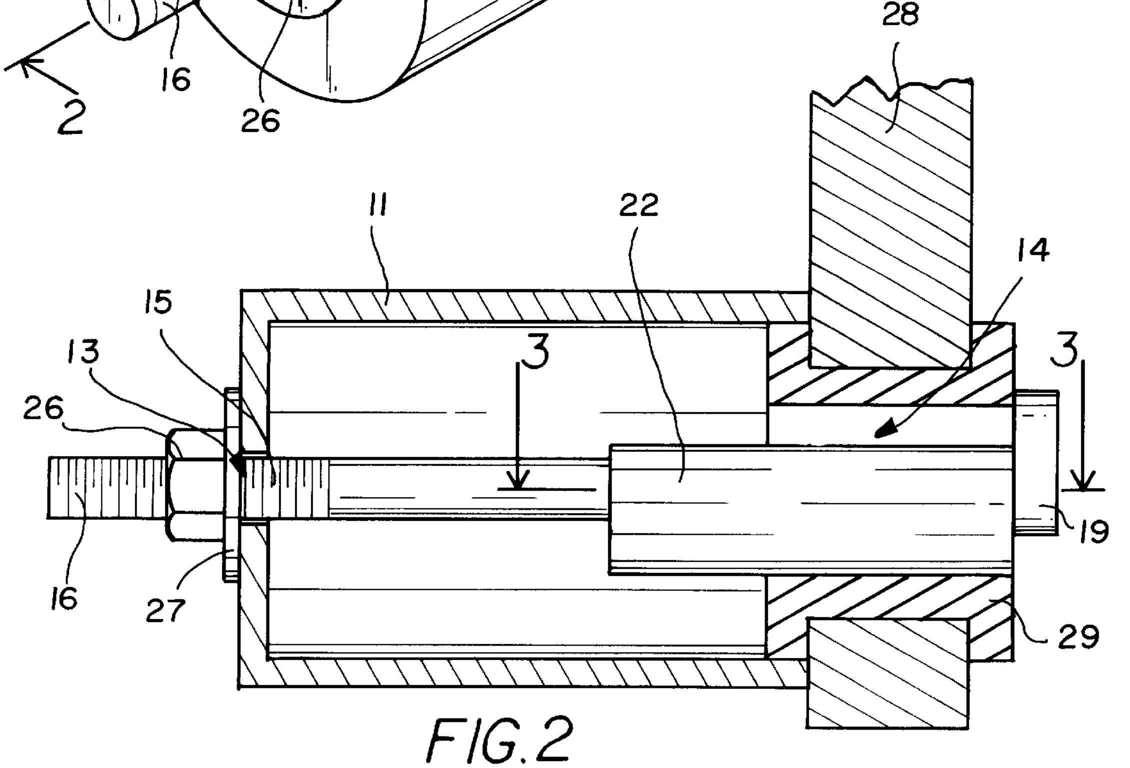
FIG. 2 is a cross-sectional view of the present invention.
Figure 5:
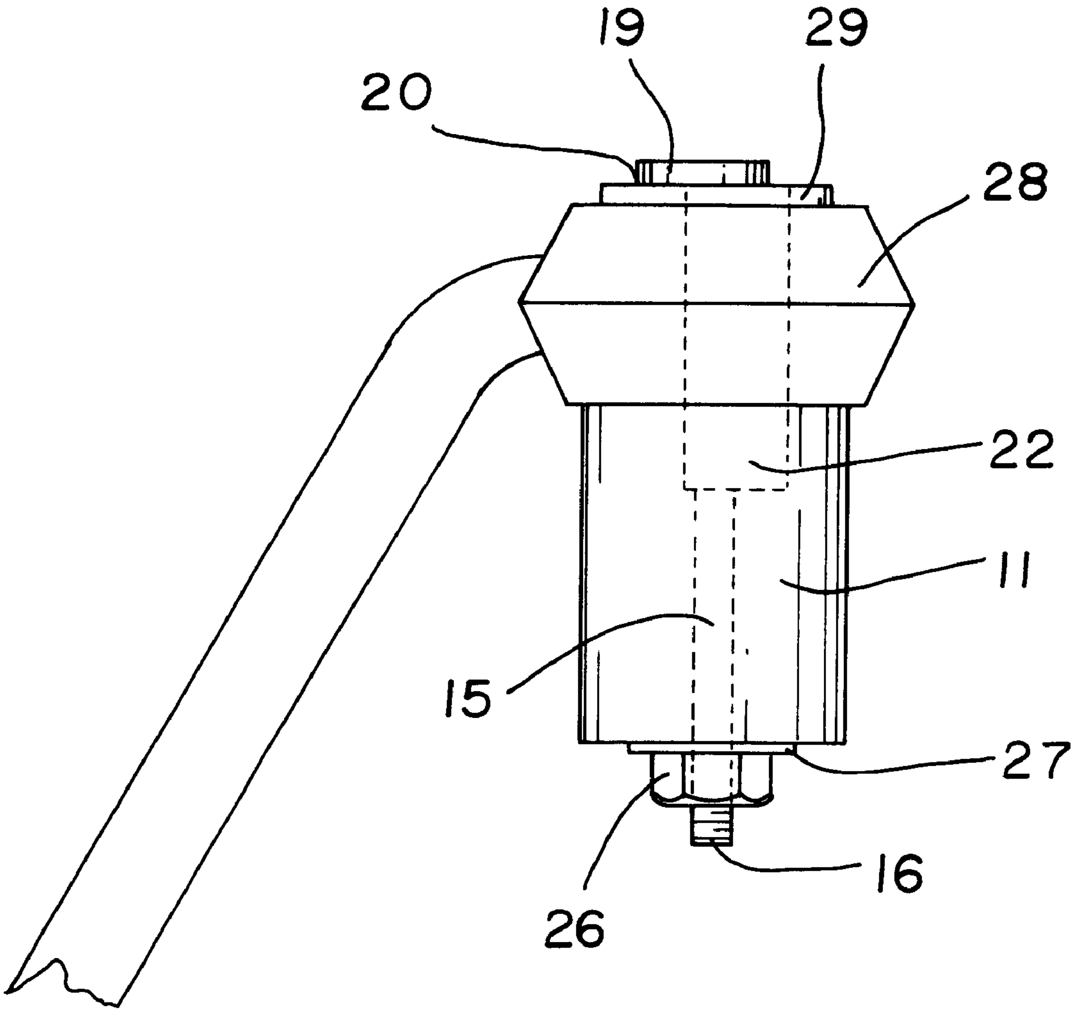
FIG. 5 is a side elevational view of the present invention in use.

With reference now to the drawings, and in particular to FIGS. 1 through 5 thereof, a new suspension dowel and bushing remover device embodying the principles and concepts of the present invention and generally designated by the reference numeral 10 will be described.

As best illustrated in FIGS. 1 through 5, the suspension dowel and bushing remover device 10 generally comprises a retainer housing 11 having a first end 12 and an open second end 14 with the first end 12 having a hole 13 therethrough. The second end 14 of the retainer housing 11 is adapted to urge against a suspension 28 for removing a dowel and bushing 29 therefrom and into the retainer housing 11 through the open second end 14. The retainer housing 11 is essentially cylindrically-shaped and has a length of approximately 4½ inches and a diameter of approximately 3½ inches. The suspension dowel and bushing remover 10 also includes a shaft 15 having a first end portion 16, a second end portion 17 and a second end 18 with the shaft 15 extending through the retainer housing 11 through the hole 13 of the first end 12. The shaft 15 includes a keyway 21 extending in and along a length of the second end portion 17 of the shaft 15. Also., the shaft 15 includes threads extending along and about the first end portion 16 thereof. A cam member 19 is securely and conventionally attached to the second end 18 of the shaft 15 and has a cam lobe 20 for engaging an end portion of a dowel and a bushing 29 with the cam lobe 20 extending outwardly generally perpendicular to the shaft 15. A collar 22 having a bore 23 extending therethrough is removably disposed about the second end portion 17 of the shaft 15 and is movable in and out of the second end 14 of the retainer housing 11 for supporting and spacing the shaft 15 within the retainer housing 11. The collar 22 includes a key member 24 integrally attached to a wall 25 forming the bore 23 and extending inwardly in the bore 23 and being adapted to be removably received in the keyway 21. The key member 24 essentially extends along a length of the collar 22. A means for securing and moving the shaft 15 relative to the retainer housing 11 includes a fastening member 26 threaded upon the first end portion 16 of the shaft 15 and also includes a stopper 27 removably disposed about the shaft 15 and between the fastening member 26 and the first end 12 of the retainer housing 11 to prevent the fastening member 26 from moving through the hole 13 of the first end 12 of the retainer housing 11. The fastening member 26 is essentially a threaded multi-sided nut which is adapted to be engaged by a tool for urging the shaft 15 outwardly away from the first end 12 of the retainer housing 11. The stopper 27 is essentially a washer which is adapted to be in contactable relationship with the first end 12 of the retainer housing 11 and with the threaded multi-sided nut 26 as the shaft 15 is being moved through the retainer housing 11 out through the first end 12 thereof.

In use, the user positions the shaft 15 and the cam member 19 in the dowel or bushing 29 with the cam lobe 20 engaging an end portion of the dowel or bushing 29, and places the collar 22 about the second end portion 17 of the shaft 15 with the key member 24 being removably received in the keyway 21 in the shaft 15, and then places the retainer housing 11 about the shaft 15 and the collar 22 with the threaded first end portion 16 of the shaft 15 extending through the hole 13 of the first end 12 of the retainer housing 11. Next, the user places the stopper 27 about the first end portion 16 of the shaft 15 and threads the fastening member 26 onto the first end portion 16 of the shaft 15, and then uses a tool to engage and thread the fastening member 26 toward the second end 18 of the shaft 15 thus causing the shaft 15 to move through the first end 12 of the retainer housing 11 and out through the first end 12 thereof with the dowel or bushing 29 being moved into the retainer housing 11 through the second end 14 thereof.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A suspension dowel and bushing remover device comprising:

a retainer housing having a first end and an open second end, said first end having a hole therethrough, said second end of said retainer housing being adapted to urge against a suspension for removing a dowel and bushing therefrom and into said retainer housing through said open second end;

a shaft having a first end portion, a second end portion and a second end, said shaft extending through said retainer housing through said hole of said first end;

a cam member being securely attached to said second end of said shaft and having a cam lobe for engaging an end portion of a dowel and a bushing;

a collar having a bore extending therethrough and being removably disposed about said second end portion of said shaft and being movable in and out of said second end of said retainer housing for spacing said shaft within said retainer housing; and a means for se curing and moving said shaft relative to said retainer housing;

wherein said shaft includes a keyway extending in and along a length of said second portion of said shaft.

2. A suspension dowel and bushing remover device as described in claim 1, wherein said collar includes a key member integrally attached to a wall forming said bore and extending inwardly in said bore and being adapted to be removably received in said keyway.

3. A suspension dowel and bushing remover device as described in claim 2, wherein said key member essentially extends along a length of said collar.

4. A suspension dowel and bushing remover device as described in claim 1, wherein said shaft includes threads extending along and about said first end portion thereof.

5. A suspension dowel and bushing remover device as described in claim 1, wherein said means for securing and moving said shaft relative to said retainer housing includes a fastening member threaded upon said first end portion of said shaft and also includes a stopper removably disposed about said shaft and between said fastening member and said first end of said retainer housing to prevent said fastening member from moving through said hole of said first end of said retainer housing.

6. A suspension dowel and bushing remover device as described in claim 5, wherein said fastening member is essentially a threaded multi-sided nut which is adapted to be engaged by a tool for urging said shaft outwardly away from said first end of said retainer housing.

7. A suspension dowel and bushing remover device as described in claim 6, wherein said stopper is essentially a washer which is adapted to be in contactable relationship with said first end of said retainer housing and with said threaded multi-sided nut as said shaft is being moved through said retainer housing out through said first end thereof.

8. A suspension dowel and bushing remover device as described in claim 1, wherein said retainer housing is essentially cylindrically-shaped.

9. A suspension dowel and bushing remover device as described in claim 1, wherein said cam lobe extends outwardly generally perpendicular to said shaft.

10. A suspension dowel and bushing remover device comprising:

a retainer housing having a first end and an open second end, said first end having a hole therethrough, said second end of said retainer housing being adapted to urge against a suspension for removing a dowel and bushing therefrom and into said retainer housing through said open second end, said retainer housing being essentially cylindrically-shaped and having a length of approximately 4½ inches and a diameter of approximately 3½ inches;

a shaft having a first end portion, a second end portion and a second end, said shaft extending through said retainer housing through said hole of said first end, said shaft including a keyway extending in and along a length of said second portion of said shaft, said shaft including threads extending along and about said first end portion thereof;

a cam member being securely attached to said second end of said shaft and having a cam lobe for engaging an end portion of a dowel and a bushing, said cam lobe extending outwardly generally perpendicular to said shaft;

a collar having a bore extending therethrough and being removably disposed about said second end portion of said shaft and being movable in and out of said second end of said retainer housing for spacing said shaft within said retainer housing, said collar including a key member integrally attached to a wall forming said bore and extending inwardly in said bore and being adapted to be removably received in said keyway, said key member essentially extending along a length of said collar; and a means for securing and moving said shaft relative to said retainer housing including a fastening member threaded upon said first end portion of said shaft and also includes a stopper removably disposed about said shaft and between said fastening member and said first end of said retainer housing to prevent said fastening member from moving through said hole of said first end of said retainer housing, said fastening member being essentially a threaded multi-sided nut which is adapted to be engaged by a tool for urging said shaft outwardly away from said first end of said retainer housing, said stopper being essentially a washer which is adapted to be in contactable relationship with said first end of said retainer housing and with said threaded multi-sided nut as said shaft is being moved through said retainer housing out through said first end thereof.

11. A suspension dowel and bushing remover device comprising:

a retainer housing having a first end and an open second end, said first end having a hole therethrough;

a shaft having a first end portion, a second end portion and a second end, said shaft extending through said retainer housing through said hole of said first end;

a cam member on said second end of said shaft having a cam lobe for engaging an end portion of a dowel and a bushing;

a collar having a bore extending therethrough and being removably disposed about said second end portion of said shaft and being movable in and out of said second end of said retainer housing for spacing said shaft in said retainer housing; and a means for securing and moving said shaft relative to said retainer housing;

wherein said shaft includes a keyway extending in and along a length of said second portion of said shaft.

12. A suspension dowel and bushing remover device as described in claim 11, wherein said collar includes a key member attached to a wall forming said bore and extending inwardly in said bore for being removably received in said keyway.

13. A suspension dowel and bushing remover device as described in claim 12, wherein said key member extends along substantially an entire length of said collar.

14. A suspension dowel and bushing remover device as described in claim 11, wherein said shaft includes threads extending along and about said first end portion thereof.

15. A suspension dowel and bushing remover device as described in claim 11, wherein said means for securing and moving said shaft relative to said retainer housing includes a fastening member threaded upon said first end portion of said shaft and also includes a stopper removably disposed about said shaft and between said fastening member and said first end of said retainer housing to prevent said fastening member from moving through said hole of said first end of said retainer housing.

16. A suspension dowel and bushing remover device as described in claim 15, wherein said fastening member comprises a nut for being engaged by a tool for urging said shaft outwardly away from said first end of said retainer housing.

17. A suspension dowel and bushing remover device as described in claim 16, wherein said stopper comprises a washer for contacting said first end of said retainer housing and said nut as said shaft is being moved through said retainer housing out through said first end thereof.

18. A suspension dowel and bushing remover device as described in claim 11, wherein said retainer housing is substantially cylindrically-shaped.

19. A suspension dowel and bushing remover device as described in claim 11, wherein said cam lobe extends outwardly in a substantially perpendicular relationship to said shaft.

* * * * *